United States Patent
Sudau

[11] Patent Number: 6,012,355
[45] Date of Patent: *Jan. 11, 2000

[54] TORSIONAL VIBRATION DAMPER WITH A COUPLING DEVICE

[75] Inventor: Jörg Sudau, Niederwerrn, Germany

[73] Assignee: Mannesmann Sachs AG, Schweinfurt, Germany

[*] Notice: This patent is subject to a terminal disclaimer.

[21] Appl. No.: 09/012,853

[22] Filed: Jan. 23, 1998

[30] Foreign Application Priority Data

Jan. 25, 1997 [DE] Germany ............................. 197 02 666

[51] Int. Cl.[7] .............................. F16F 15/10; F16F 15/22; G05G 1/00
[52] U.S. Cl. ............................ 74/574; 74/572; 74/573 R; 74/273 F
[58] Field of Search .................................. 74/572, 573 R, 74/573 F, 574, 273 F; 464/66, 68

[56] References Cited

U.S. PATENT DOCUMENTS

| | | | |
|---|---|---|---|
| 2,653,457 | 9/1953 | Guernsey et al. | 74/574 |
| 5,557,984 | 9/1996 | Cooke et al. | 74/574 |
| 5,836,217 | 11/1998 | Sudau et al. | 74/574 |

FOREIGN PATENT DOCUMENTS

| | | |
|---|---|---|
| 36 30 398 | 5/1987 | Germany . |
| 42 00 174 | 8/1992 | Germany . |
| 195 40 157 | 5/1996 | Germany . |
| 2 315 112 | 1/1998 | United Kingdom . |
| WO 95/17616 | 6/1995 | WIPO ....................................... 74/574 |

*Primary Examiner*—Rodney H. Bonick
*Assistant Examiner*—Roger Pang
*Attorney, Agent, or Firm*—Cohen, Pontani, Lieberman & Pavane

[57] ABSTRACT

A torsional vibration damper having a plurality of transmission elements which are rotatable relative to one another about a common axis of rotation. A movement which is conducted to one of the transmission elements can be conducted to the other transmission element by a coupling device which acts in an articulated manner at one of the transmission elements via at least one coupling member. Further, at least one guide path is associated with the coupling device in at least one other transmission element. A thrust element connected with the coupling member for transmitting a movement with a component in the circumferential direction to the transmission element can be guided along this guide path.

3 Claims, 3 Drawing Sheets

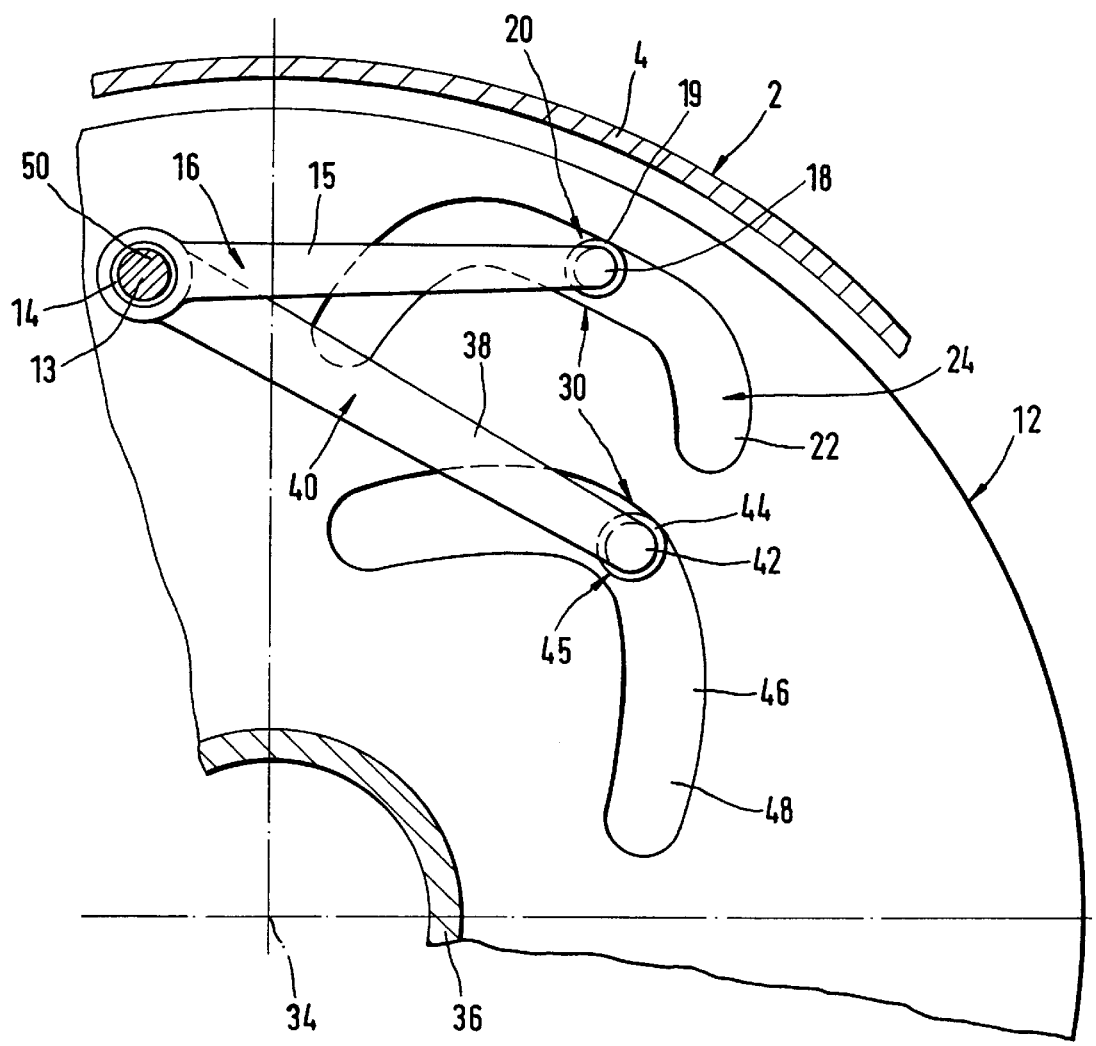

TORSIONAL VIBRATION DAMPER WITH A COUPLING DEVICE

BACKGROUND OF THE INVENTION

1. Field of the Invention

The invention is directed to a torsional vibration damper.

2. Discussion of the Prior Art

A torsional vibration damper with two transmission elements which are rotatable relative to one another about a common axis of rotation is known from German reference DE 42 00 174 Al. A movement conducted to one of the transmission elements can be conducted to the other respective transmission element by means of a coupling device. The coupling device has a coupling member which is arranged at the drive-side transmission element in an articulated manner and acts on a mass via a joint. This mass connected in turn with the transmission element on the driven side in an articulated manner.

In torsional vibration dampers with a coupling device of this kind between the transmission elements in connection with a mass, the instantaneous position of the individual elements of the coupling device relative to one another substantially depends on the centrifugal force determined by the rate of rotation and on the intensity of the torsional vibrations that are introduced. The centrifugal force tends to pull the individual elements radially outward, while the torsional vibrations tend to compel a deflection in the circumferential direction from this stable middle position. The centrifugal force increases as the rate of rotation increases, so that the coupling device is perceived as having greater stiffness at a higher rate of rotation than at a low rate of rotation. Accordingly, a torsional vibration damper of this kind does not present difficulties as regards resonant frequencies and is therefore very well-suited for damping torsional vibrations which occur in motor vehicles with internal combustion engines below 1000 RPM. However, against this advantage there is the disadvantage that the coupling device itself responds relatively inertly due to the use of the individual elements in connection with a mass which are oriented under the influence of centrifugal force. Further, a coupling device of this kind is sensitive to relative wobbling movements between the two transmission elements because the wobbling movements lead to tilting in the region of the joint connecting the coupling member with the mass, resulting in wear at this joint. A further disadvantage is that the coupling member and mass can occupy two different end positions relative to one another, so that there is no clearly defined relative position between the two transmission elements.

German reference DE 36 30 398 A1 describes a torsional vibration damper which likewise has two transmission elements which are rotatable relative to one another about a common axis of rotation, but in which the coupling device is formed by springs in a working connection with the two transmission elements in order to transmit a movement conducted to one of the transmission elements. A coupling device of this kind works so as to be relatively free of inertia, but is comparatively expensive and has the considerable disadvantage that the resonant frequency of the torsional vibration damper is also predetermined by the selected spring rigidity. At determined rates of rotation in the motor vehicle containing the torsional vibration damper, this causes at least a loss of comfort but under less favorable circumstances can also lead to damage or even destruction of the torsional vibration damper.

SUMMARY OF THE INVENTION

Accordingly, it is an object of the present invention to provide a torsional vibration damper in which the stiffness of its coupling device between the transmission elements can be varied depending on parameters. It is a further object to provide a torsional vibration damper that has low inertia and is not sensitive to wobbling movements.

Pursuant to this object, and others which will become apparent hereafter, one aspect of the present invention resides a torsional vibration damper comprising of a plurality of transmission elements which are rotatable relative to one another by a common axis, and coupling means for conducting movement of one of the transmission elements to the other transmission elements. The coupling means includes a first coupling member articulated to one of the transmission elements, at least one guide path formed in the other transmission element, a thrust element connected to the first coupling member and guided along the guide path so as to transmit to the other transmission element a movement with a component in a circumferential direction of the transmission elements.

Due to the fact that the coupling device is constructed with a coupling member which is connected to a thrust element, a torsional vibration damper is provided in which the coupling member and thrust element are aligned radially outward in the region of the associated guide path under the influence of centrifugal force during the rotation of the transmission elements. For this purpose, the respective deflecting position of the coupling member relative to an articulation of the same at one of the transmission elements and the position of the thrust element in the region of the associated guide path considered in the circumferential direction is dependent not only on the centrifugal force but also on the intensity of the introduced torsional vibrations. The centrifugal force tends to rotate the coupling member about the articulation at the transmission element so that the thrust element moves radially outward, while torsional vibrations attempt to cause a movement of the coupling member and thrust element in the respective opposite directions. As the centrifugal force increases due to an increasing rate of rotation, so does the persistence with which the elements of the coupling device oppose a deflection from their radial initial position, so that the coupling device develops the behavior of spring stiffness which increases as the rate of rotation of the transmission elements increases. As a result, the "spring stiffness" at low rates of rotation at the transmission elements and accordingly at the driving internal combustion engine is very low, so that low frequencies, e.g., below 1000 RPM, can also be damped in an outstanding manner especially since the torsional vibration damper has no fixed resonant frequency. Due to a constant radius at the guide path, a c-value of 0 Nm/° can even be achieved in a defined angular range. Since only the coupling member with the thrust element acting thereon acts as mass, this advantageous characteristic goes hand in hand with a low-inertia working behavior of the coupling device, so that the spring stiffness can be adapted very quickly to the changed operating conditions.

Additional damping/friction devices (e.g., Coulomb friction and/or liquid damping) can also act between the transmission elements to optimize the decoupling behavior and/or to protect structural component parts. When suitably sealed, the torsional vibration damper can be filled at least partially with a lubricating medium, e.g., grease, in order to increase service life and prevent destruction.

Apart from the coupling member, there is only provided at least one guide path which is associated with the thrust element and is realized at the other transmission element. Because of this, and since the guide path can be punched out of the transmission element or pressed into it, for example, this coupling device is easy to manufacture and facilitates a compact construction in the axial direction, but when the guide path extends substantially in the circumferential direction also benefits a compact construction in the radial direction. Further, by allowing for play by which the thrust element can move in or on the guide path, wobbling movements can be compensated in an outstanding manner between the drive-side transmission element and the driven-side transmission element, so that the coupling device works with relatively low friction losses and greatly reduced wear.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 4 shows a view like that in FIG. 2, but with a second coupling member and thrust element and with a second guide path.

DETAILED DESCRIPTION OF THE PREFERRED EMBODIMENTS

Figure 1:
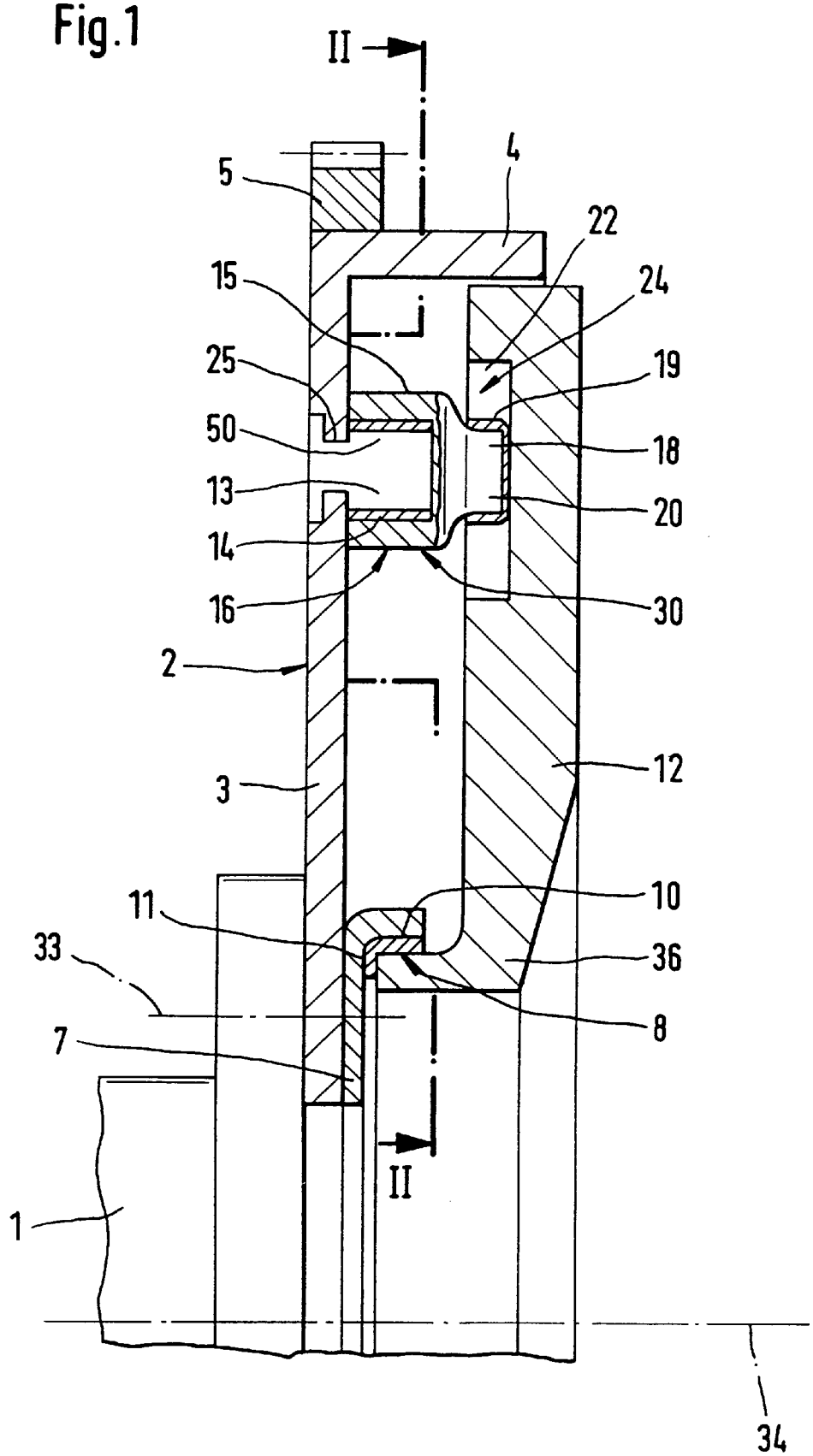
FIG. 1 is a section of the upper half of a torsional vibration damper with a coupling member and a thrust element which engages in a guide path, along a line I—I in FIG. 2.

As is shown in FIG. 1, a drive-side transmission element 2 is fastened to a crankshaft 1 of an internal combustion engine via fastening elements 33 which are shown schematically by a dash-dot line. The transmission element 2 has a primary flange 3 which extends radially outward and passes into an axial shoulder 4 which extends away from the crankshaft 1. The axial shoulder 4 is provided for the purpose of receiving a toothed ring 5 which is brought into a working connection with a starter pinion, not shown. A primary hub 7 is provided in the radial inner region of the primary flange 3 and is likewise held by the fastening elements 33 and serves to receive a bearing 8 which is composed of a radial sliding bearing 10 and an axial sliding bearing 11. A driven-side transmission element 12 is provided so as to be rotatable relative to the drive-side transmission element 2 via the bearing 8. The clutch housing is carried on this transmission element in a conventional manner, which is accordingly not shown, with the friction clutch which enables the engagement or disengagement process.

Figure 2:
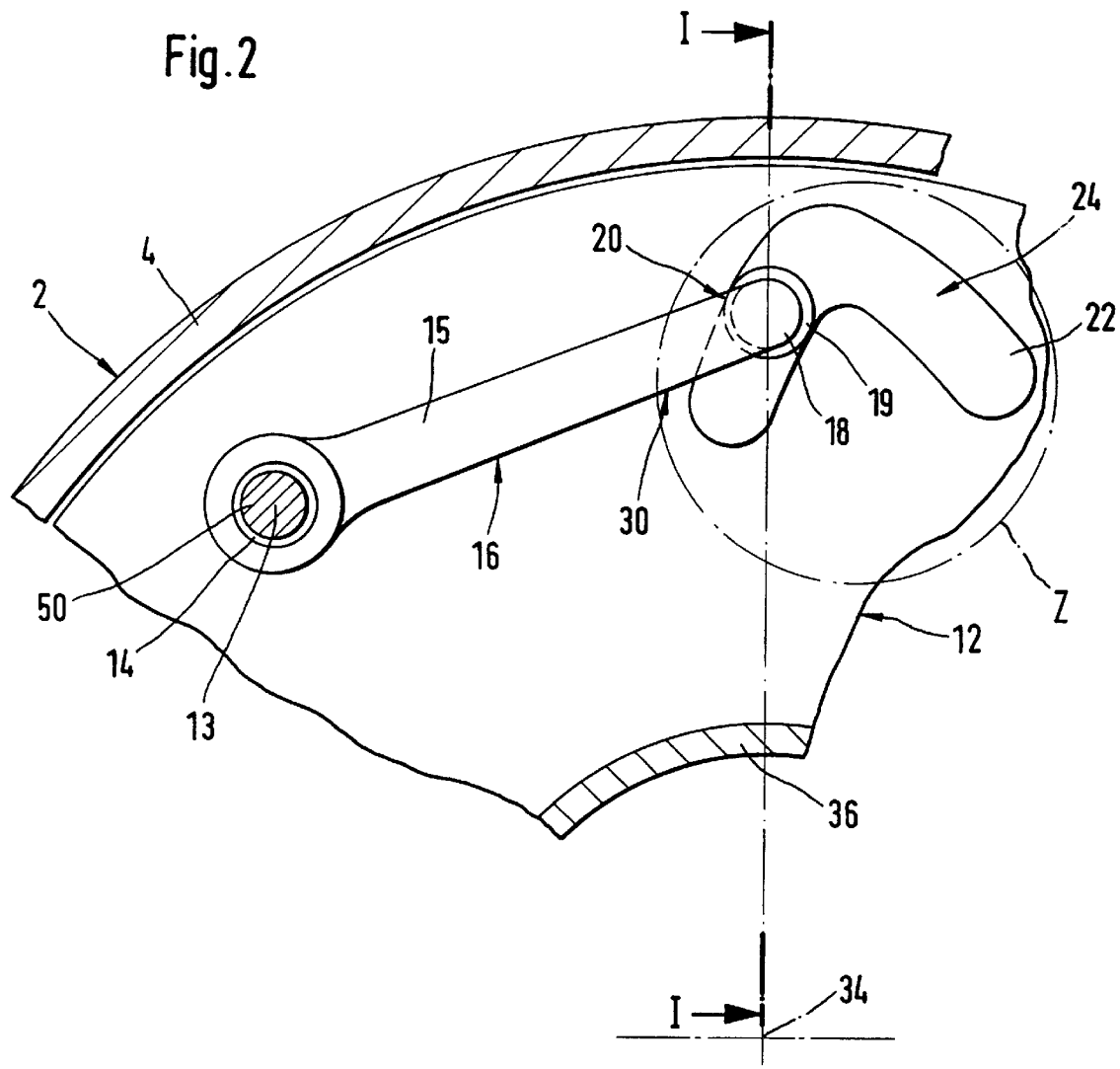
FIG. 2 is a section along line II—II in FIG. 1.

At least one recess 25 is provided in the primary flange 3 of the drive-side transmission element 2 for receiving a pin 13 which receives a connecting rod 15 so as to be swivelable thereon via a sleeve 14. The connecting rod 15 acts as a coupling member 16 between the two transmission elements 2, 12 and is swivelable about the pin 13 serving as an articulation 50 and the sleeve 14. As can be seen more clearly in FIG. 2, the coupling member 16 receives, at the opposite end, a pin 18 which is enclosed by a sleeve 19 and serves as a thrust element 20 which is guided in a groove 22 of the driven-side transmission element 12. This groove 22, which can be produced, for example, by indentation, serves as a guide path 24 for the coupling device 30, which includes the coupling member 16 and the thrust element 20.

The driven-side transmission element 12 engages in the bearing 8 via a secondary hub 36. Accordingly, the driven-side transmission element 12 and the drive-side transmission element 2 mentioned above are both guided so as to be rotatable about the center axis 34.

The operation of the coupling device will now be described. As the rate of rotation of the transmission elements 2, 12 increases, the coupling member 16 is deflected in the counterclockwise direction as viewed in FIG. 2. The thrust element 20 is accordingly forced outward radially. As a result of this, a deflection of the driven-side transmission element 12 relative to the transmission element 2 on the drive side can be compelled depending on the course of the guide path 24. Starting at a determined rate of rotation, the two transmission elements 2, 12 occupy a determined position relative to one another in which the coupling member 16 is located in a rotational position around the articulation 50 in which the thrust element 20 contacts the outermost radial position of the guide path 24. Torsional vibrations which are introduced via the crankshaft 1 cause a deflection of the thrust element from this position of the guide path, wherein the deflecting direction is determined by the effective direction of the torsional vibration, while the facility of deflection depends on the respective rate of rotation of the transmission elements and their mass, mass moment of inertia, and geometry. This is clarified as follows: As the rate of rotation increases, so also does the centrifugal force which presses the thrust element 20 against the outermost radial position of the guide path 24. Because of this contact pressure, the capability of the thrust element 20 and accordingly that of the coupling member 16 to persist in this position increases as the rate of rotation increases, so that the overall behavior of the torsional vibration damper changes as if the stiffness of a spring contained in the coupling device 30 were increasing as the rate of rotation increases. The reverse applies when the rate of rotation decreases.

Figure 3:
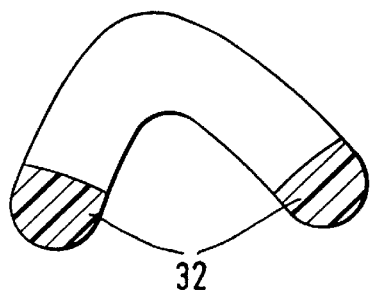
FIG. 3 shows a detail of the guide path in FIG. 2 with stops for the thrust element which are contained in the guile path.

When the internal combustion engine is turned off, the thrust element 20 is pulled out of the outermost radial position of the guide path 24 due to the force of gravity and/or depending on torsional vibrations and preferably comes to a stop in one of the two radially inner end positions of the guide path 24 when the guide path substantially extends in a straight line but, on the other hand, when the course of the guide path comprises a radial direction component, comes to a stop in a clearly defined end position and accordingly in an associated defined relative position of the transmission elements 2, 12. The guide path 24 according to FIG. 3 is provided, in the area of its circumferential ends, with stops 32 which are preferably made of resilient material, so that these end positions can be approached in the smoothest possible manner.

When the internal combustion engine is started again, the thrust element 20 is moved again into the outermost radial position of the guide path 24 in the manner described above and in so doing deflects the coupling member 16 in a corresponding manner.

FIG. 4 shows another embodiment of the torsional vibration damper in which is provided a second connecting rod 38 is provided as a second coupling member 40 between the transmission elements 2, 12 and is likewise supported so as to be swivelable about the articulation 50. For this purpose, the pin 13 as well as the sleeve 14 need only be suitably lengthened in the axial direction relative to the construction in FIG. 1. A second pin 42 is provided at the free end of the second coupling member 40. The pin 42 is enclosed by a second sleeve 44 and forms a thrust element 45 which cooperates with a second guide path 48 in the driven-side transmission element 12. The guide path 48 is also constructed in the form of a groove 46.

Of essential importance in this construction of the torsional vibration damper is the fact that one of the thrust elements, namely the first thrust element 20, is located radially outside of the radius on which the articulation 50 of the coupling members 16, 40 is provided, while the second thrust element 45 lies radially inside of this radius. In connection with this design step and different configurations of the guide paths 24 and 48, the coupling device 30 accordingly has two coupling members and thrust elements which work according to different characteristic lines with different force components.

As a result of a configuration of the guide path 48 with a constant radius on at least one part of its length, the effect of the additional coupling member 40 over the corresponding area is very limited. By omitting this area, an effect comparable to the addition of further mass can be achieved by means of the coupling member 40.

The invention is not limited by the embodiments described above which are presented as examples only but can be modified in various ways within the scope of protection defined by the appended patent claims.

I claim:

1. A torsional vibration damper, comprising:

at least two transmission elements which are rotatable relative to one another about a common axis; and coupling means for conducting movement of one of the transmission elements to the other transmission elements, the coupling means including a first coupling member articulated to one of the transmission elements, at least one guide path formed in the other transmission element, a first thrust element connected with the first coupling member and guided along the guide path so as to transmit a movement to the other transmission element with a component in a circumferential direction.

2. A torsional vibration damper according to claim 1, wherein the guide path is configured to extend at least partially in a radial direction of the other transmission element.

3. A torsional vibration damper, comprising:

at least two transmission elements which are rotatable relative to one another about a common axis; and coupling means for conducting movement of one of the transmission elements to the other transmission elements, the coupling means including a first coupling member articulated to one of the transmission elements, at least one guide path formed in the other transmission element, a first thrust element connected with the first coupling member and guided along the guide path so as to transmit a movement to the other transmission element with a component in a circumferential direction, the coupling means further includes a second coupling member which is articulated to the one transmission element that is adapted for conducting movement to the other transmission element, a second guide path in the other transmission element, a second thrust element connected to the second coupling member and guided along the second guide path so as to be offset radially to the articulation of the second coupling member to the one transmission element, the radial offset being on a side radially opposite to a radial offset of the first thrust element to the articulation of the first coupling member to the one transmission element.

* * * * *